(12) United States Patent
Jayaraman

(10) Patent No.: US 8,862,661 B2
(45) Date of Patent: Oct. 14, 2014

(54) PROCESSING CONTENT IN A PLURALITY OF LANGUAGES

(75) Inventor: Karthik Jayaraman, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 89 days.

(21) Appl. No.: 13/639,506

(22) PCT Filed: Apr. 29, 2010

(86) PCT No.: PCT/US2010/032874
§ 371 (c)(1),
(2), (4) Date: Oct. 4, 2012

(87) PCT Pub. No.: WO2011/136768
PCT Pub. Date: Nov. 3, 2011

(65) Prior Publication Data
US 2013/0031166 A1    Jan. 31, 2013

(51) Int. Cl.
*G06F 15/16* (2006.01)
*G06F 17/28* (2006.01)

(52) U.S. Cl.
CPC .................................. *G06F 17/289* (2013.01)
USPC .......................................... 709/203; 709/228

(58) Field of Classification Search
None
See application file for complete search history.

(56) References Cited

U.S. PATENT DOCUMENTS

| | | | | |
|---|---|---|---|---|
| 5,392,386 A * | 2/1995 | Chalas | ................. | 715/841 |
| 5,594,642 A * | 1/1997 | Collins et al. | ................. | 715/236 |
| 5,974,372 A * | 10/1999 | Barnes et al. | ................. | 704/8 |
| 6,092,036 A * | 7/2000 | Hamann | ................. | 704/8 |
| 7,224,346 B2 * | 5/2007 | Sheng | ................. | 345/171 |
| 7,318,020 B1 * | 1/2008 | Kim | ................. | 704/2 |
| 7,340,388 B2 * | 3/2008 | Soricut et al. | ................. | 704/4 |
| 7,539,619 B1 * | 5/2009 | Seligman et al. | ................. | 704/277 |
| 2001/0029455 A1 * | 10/2001 | Chin et al. | ................. | 704/277 |
| 2002/0103632 A1 * | 8/2002 | Dutta et al. | ................. | 704/2 |
| 2003/0140316 A1 | 7/2003 | Lakritz | | |
| 2005/0021322 A1 * | 1/2005 | Richardson et al. | ................. | 704/2 |
| 2005/0086214 A1 * | 4/2005 | Seewald et al. | ................. | 707/3 |
| 2006/0200766 A1 * | 9/2006 | Lakritz | ................. | 715/536 |
| 2006/0210026 A1 | 9/2006 | Duplessis et al. | | |
| 2008/0195372 A1 * | 8/2008 | Chin et al. | ................. | 704/2 |
| 2009/0125497 A1 * | 5/2009 | Jiang et al. | ................. | 707/4 |
| 2009/0210214 A1 * | 8/2009 | Qian et al. | ................. | 704/2 |
| 2010/0115424 A1 * | 5/2010 | Young et al. | ................. | 715/753 |
| 2011/0282647 A1 * | 11/2011 | Pastore | ................. | 704/4 |

OTHER PUBLICATIONS

International Search Report, PCT/US2010/032874, Jan. 11, 2011, 9 Pages.

* cited by examiner

*Primary Examiner* — Ninos Donabed
(74) *Attorney, Agent, or Firm* — Arthur Ortega

(57) ABSTRACT

A method for processing content in a plurality of languages which comprises generating, by an application program at a client computer, a request to a server computer for first content which is in a first language, if the first content is not stored in an embedded database of the client computer. The method comprises automatically receiving from the server computer updated first content in the first language, if there is a change in second content which is content in a second language translated from the first language.

20 Claims, 3 Drawing Sheets

PROCESSING CONTENT IN A PLURALITY OF LANGUAGES

BACKGROUND

Computers may be used to execute programs that display content in many languages. It is desirable to improve the manner in which computers process content in many languages.

BRIEF DESCRIPTION OF THE DRAWINGS

For a detailed description of exemplary embodiments, reference will now be made to the accompanying drawings in which.

DETAILED DESCRIPTION

As will be explained below in further detail, in some embodiments, disclosed is a client computer for processing content in a plurality of languages. The client computer may includes an application program which requests content in a plurality of languages for display when needed from a server computer so to help reduce storage requirements of the client computer. The client computer may store the content in an embedded database to help reduce the need for user management of the content. The client computer may be configured to automatically receive updated content from the server computer when there are changes to the content at the server computer.

Figure 1:
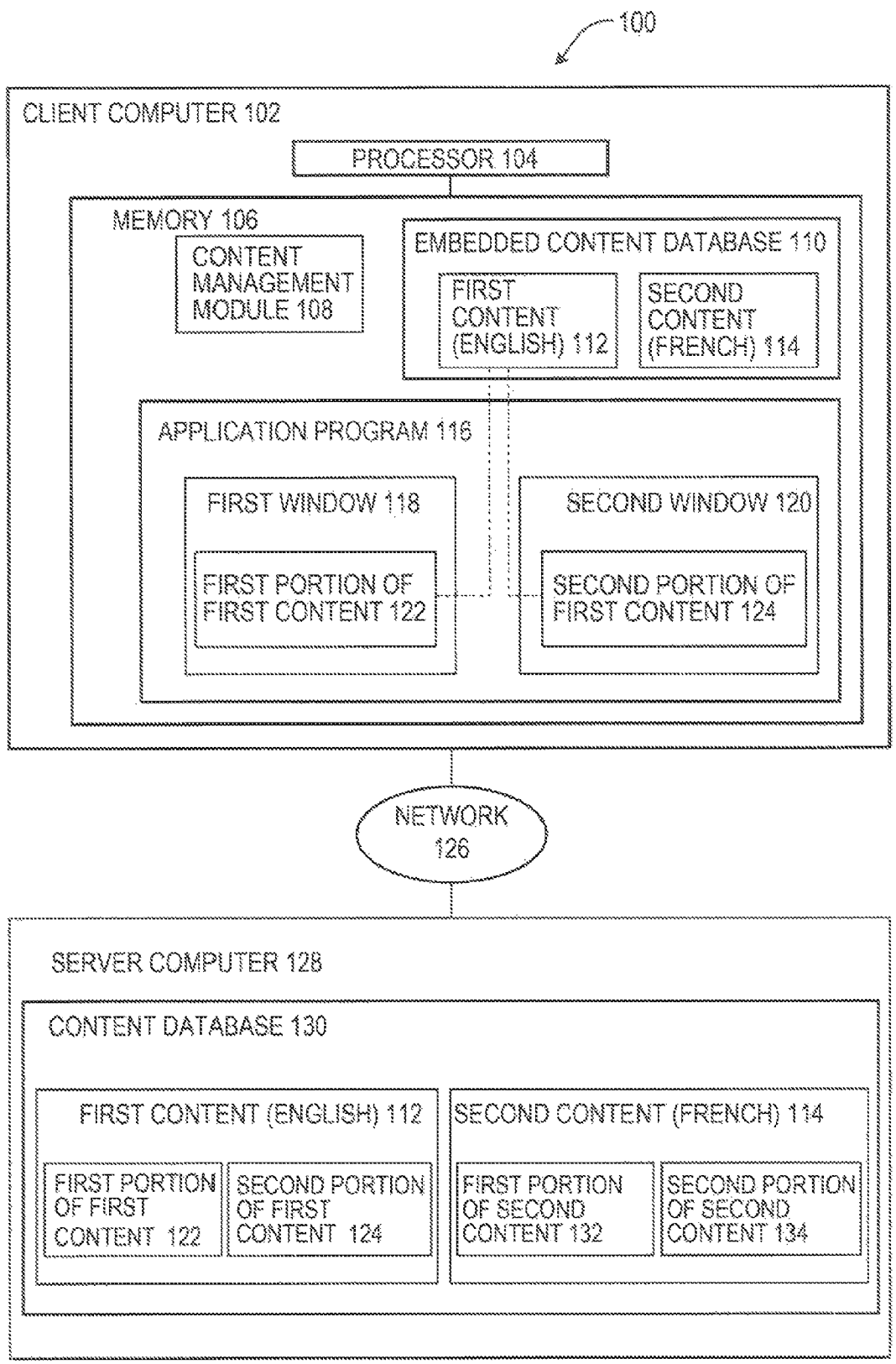
FIG. 1 shows a system for processing content in a plurality of languages, constructed in accordance with at least some illustrative embodiments.

FIG. 1 shows an embodiment of a system 100 for processing content in a plurality of languages. The system 100 includes client computer 102 coupled to server computer 128 over network 126. The client computer 102 is configured to request and receive content in a plurality of languages from server computer 126. The client computer 102 comprises processor 104 coupled to memory 106 which includes instructions to be executed by processor 104 to control the operation of the client computer. In some embodiments, memory 106 comprises content management module 108 which has instructions executable by the processor for managing content for use by embedded content database 110 and application program 116.

In one embodiment, content management module 108 may be configured to manage content requests from application program 116, such as, when application program needs content during execution of the program. For example, application program 116 may include user interface (UI) objects or elements, such as buttons, which may be displayed with text. In some embodiments, during execution of application program 116, the program may need to display text in the buttons. To obtain the text, the program may send a request to management module 108 to retrieve the text or other content from embedded database or request the content from server computer. The management module 108 is configured to check if the content is stored in embedded database 110. If management module 108 determines that the content is in embedded database 110, then it can retrieve the content from the database and forward it to application program for processing by the program. On the other hand, if management module 108 determines that the content is not stored in embedded database 110, then it may send a request to the server computer for the content. In this case, management module 108 waits to receive the content from the server. When it does receive the content, it may store it in embedded database 110 and forward it to application program 116 for further processing by the program.

In one embodiment, management module 108 may be capable of establishing a bind relationship between the content of embedded database 110 and the content of database 130 on server computer 128. The bind relationship may provide a synchronization mechanism which may allow server computer 128 to notify client computer 102 of any changes to content that occurs at the server computer. In one embodiment, server computer 128 may notify client computer 102 in an asynchronous manner by automatically sending updated content to the client computer when there are changes in content. This can be performed without having the client computer request content from the server computer. In one embodiment, client computer 102 may request from server computer 128 for the latest content in a periodic manner. In another embodiment, client computer may request content on an on-demand manner such as when the application is executing and requires content to operate properly.

In one embodiment, embedded content database 110 is configured to store and retrieve content such as text, video, graphics, or other content that can be used by application program 116. In one embodiment, embedded database 110 can be a database management system which is tightly integrated with application program 116. The database 110 can provide access to stored data, such that the database is "hidden" from the application's end user and provide no user access and requires little or no ongoing maintenance. In one embodiment, embedded database 110 may comprise first content 112 and second content 114. The first content 112 may comprise content in a first language and second content 114 may comprise content in a second language translated from the first language. In one embodiment, first content may be in the English language and second content may be in the French language. The content, or portions thereof, client computer 102 may receive the content from server computer 128 fully translated without having the client computer to perform any translation. In another embodiment, the content, or portions thereof, may be installed in the embedded database when the client computer is shipped and may require no further translation by the client computer. The first content 122 and second content may be organized as table entries with text values and identifiers associated or linked with the corresponding identifiers. The database can be configured to establish a bind relationship between the content in embedded database and content database of the server computer. This relationship may allow the server computer 128 to notify client computer 102 of any changes to the first content. In one embodiment, server computer 128 can notify client computer 102 in an asynchronous manner by automatically sending update content to the client computer as soon as there is a change in content. The embedded database 110 shown in FIG. 1 is for illustrative purposes. It should be understood, that the embedded database can comprise content in more than two languages and languages other than French and English.

In one embodiment, application program 116 may comprise software instructions executable by processor 104. The application program 116 can be a word processing program, database program, calendar program, spreadsheet program or any other program capable of being executable by a computer.

In one embodiment, application program 116 may comprise first window 118 and second window 120. The application program 116 may provide a user with the capability to navigate between the windows. The first window 118 can display first portion of first content 122 and second window 120 can display second portion of first content 124. The windows 122, 124 can comprise user interface (UI) elements or objects such as text boxes, buttons, dropdown lists and/or other objects commonly known. When the application program 116 is executed, it can send requests to management module 108 for content. In one embodiment, application program 116 can be a standard "desktop program" that does not have requirements or functionality for communicating over a network. In one embodiment, application program may be configured to operate without the need to communicate over a network. For example, the application program may be a standalone program which communicates directly with management module and does not have browser functionality to communicate over the Internet. The application program 118 shown in FIG. 1 is for illustrative purposes. It should be understood that application program 116 can comprise a single window or more than two windows.

In one embodiment, server computer 128 may comprise content database 130. The server computer 128 may be configured to manage content requests from client computer 102. These requests may be generated when application program 116 needs content for proper operation. For example, application program may need to display text during operation and the text may not be available on embedded database 110 at client computer 102. As a result, client computer may send requests to server computer for the necessary content. In one embodiment, server computer 128 may be configured to detect changes in content in database 130 and to notify client computer 102 of such changes. The server computer 128 can notify the client computer in an asynchronous manner by automatically sending update content to the client computer as soon as there is a change in content. This can be performed without client computer 102 having to request for the latest content or change in content. The content database 130 comprises first content 112 and second content 114. The content can be in different languages. The first content 112 may comprise content in a first language and second content 114 may comprise content in a second language translated from the first language. In one embodiment, first content may be in the English language and second content may be in the French language. The content in the content database 130 is synchronized with the content in embedded database 110 of the client computer. The content that is sent to client computer 102 is fully translated in a particular language such as French. The translation of the content is performed at the server computer. In other words, client computer 102 receives fully translated content from server computer 128. The database 130 shown in FIG. 1 is shown for illustrative purpose. It should be understood that content database 130 can comprise more than content 112, 114 and be in different languages A single client computer 102 is shown in system 100. However, it should be understood that the system can employ a plurality of client computers. The client computer can be any electronic device capable of electronic communication over network 128. Likewise, a single server computer 128 is shown in system 100, but it should be understood that the system can employ a plurality of server computers. The network 126 can be any means for allowing electronic communication between electronic devices. In some embodiments, the network can comprise wired or wireless communication means.

The processor 104 can be a general purpose microprocessor, microcontroller, digital signal processor, etc. configured to execute software programs or computer-executable instructions. The components of a processor are well known in the art and generally include execution units (e.g., integer, fixed point, floating point, etc.), instruction decoding, registers, memories input/output ports, etc, interconnected by buses. The memory 106 can include various storage media, for example, magnetic storage (e.g., hard disks, floppy disks, tape, etc.), optical storage (e.g., compact disk, digital video disk, etc.), or semiconductor memory (e.g., static or dynamic random-access-memory ("SRAM" or "DRAM"), read-only-memory ("ROM"), FLASH memory, magnetic random access memory ("MRAM"), etc.). The system 100 includes software programming stored in memory 106 that when executed by processor 104 to control the operation of computer 102.

Some embodiments of client computer 102 can include an input/output subsystem which can comprise input devices, such as a keyboard, a mouse, etc. Embodiments can also include various input/output sub-systems to implement, for example, wired and/or wireless networking. In FIG. 1, computer 102 is depicted as general purpose computer, however in practice computer 102 can be any of a variety of electronic devices. For example, computer 102 can be a telephone, personal digital assistant, music player, desktop computer, laptop computer, satellite navigation system, gaming system or other device.

Figure 2:
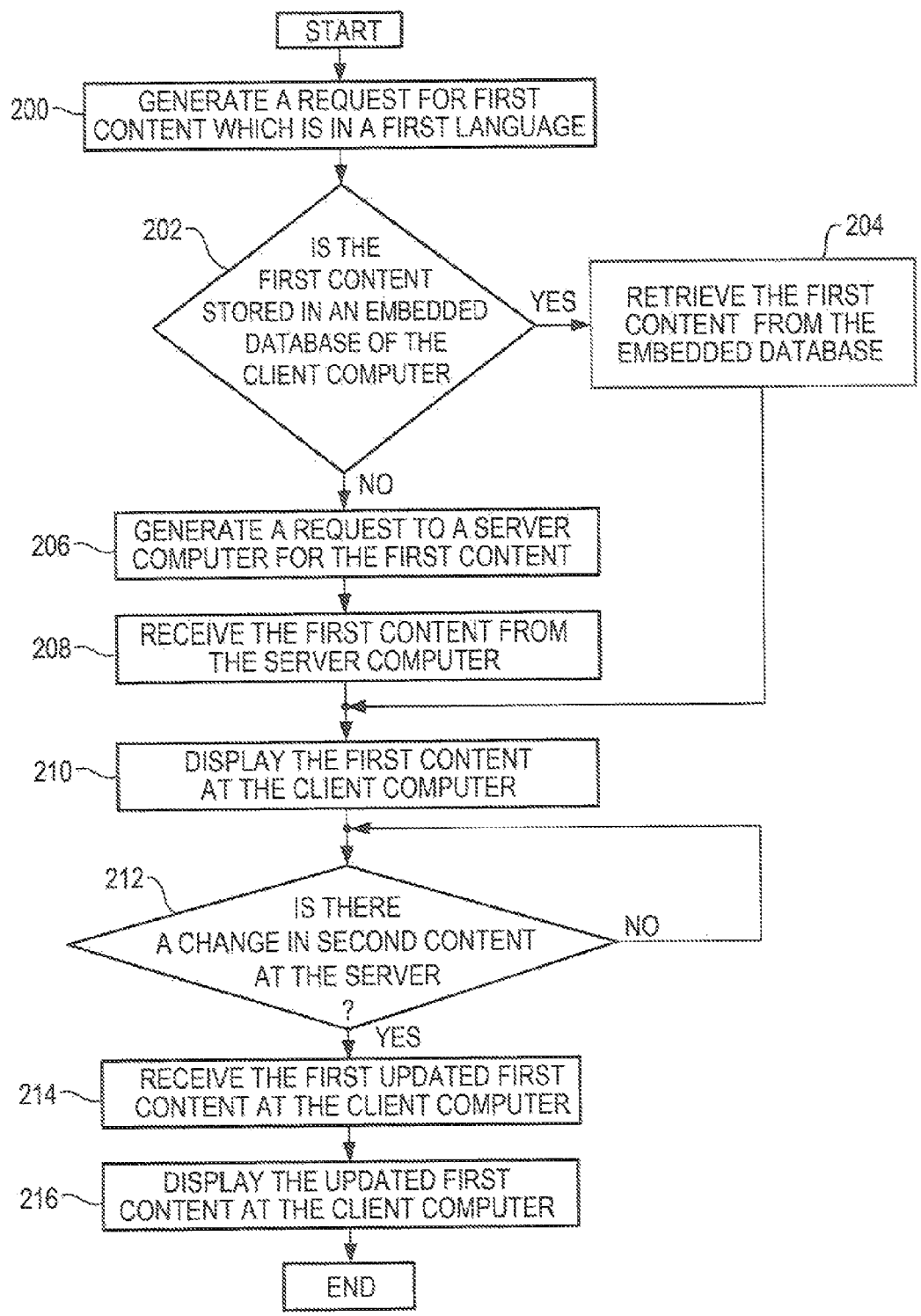
FIG. 2 is a flow chart showing a method of processing content in a plurality of languages, constructed in accordance with at least some illustrative embodiments.

FIG. 2 shows a flow diagram of a method for processing content in a plurality of languages in accordance with various embodiments. The method will be described with reference to system 100 shown in FIG. 1. It should be understood, that though depicted sequentially as a matter of convenience, at least some of the actions shown can be performed in a different order and/or performed in parallel. Additionally, some embodiments may perform only some of the actions shown.

To illustrate, in one embodiment, it will be assumed that a user is interested in executing application program 116 on client computer. It will be further assumed that application program 116 is capable of displaying first content 112 such as text content. It will be further assumed that first content 112 is in the English language and second content 114 is in the French language. Further, the user establishes a network connection over network 126 between client computer 102 and server computer 128. It also assumed that application program 116 is a word processing program. Of course, the system is configured to operate in a similar manner when using other programs such as a database program, calendar program, contact program, spreadsheet program or any other program.

At block 200, client computer 102 generates a request for first content 112. In some embodiments, application program 116 may generate the request in response to the user executing application. In one embodiment, application program 116 may require first content 112 because it displays first content as part of its operation. In some embodiments, management module 108 may manage this request for further processing, as explained below.

At block 202, client computer 102 may check if first content 112 is stored in embedded database 110 of client computer. In some embodiments, management module 108 may receive the above request and check whether first content in stored in embedded database 110. If management module 108 determines that first content 112 is stored in embedded database 110, then processing proceeds to block 204 (as explained below) where the management module retrieves the first content from the embedded database. On the other hand, if first management module 108 determines that first content 112 is not available in embedded database 110, then processing proceeds to block 206 (as explained below), where the management module generates a request to server computer 128 for first content.

At block 204, client computer 102 determines that first content 112 is stored in embedded database 110 and proceeds to retrieve first content from the embedded database. In one embodiment, management module 108 retrieves first content 112 and forwards the content to application program 116 for further processing such as display by the application program. Once first content has been forwarded to application program 116, processing proceeds to block 210 (as explained below), where application program displays first content.

At block 206, on the other hand, if client computer 102 determines that first content 112 is not available in embedded database 110, then client computer proceeds to generate a request to server computer 128 for first content. The server computer may receive the request and proceed to retrieve first content 112 from content database 130 and then send the content back to client computer 102 for further processing. Processing proceeds to block 208 where client computer 102 awaits to receive first content from server computer.

At block 208, client computer 102 receives first content 112 from server computer 128. In some embodiments, management module 108 may receive first content and the store the received content in embedded database for future use by application program. In one embodiment, the management module 108 may forward the received first content to application program for display by application program. Processing then proceeds to block 210 (as explained below), where application program processes first content.

At block 210, application program 116 displays first content 112 at client computer 102. In one embodiment, application program 116 may format the content in a manner consistent with requirements of the program. For example, application program 116 may place the content as part of a UI element of first window 118. For example, in one embodiment, the content may be placed in a text box object on first window. Once application program 116 displays the content, processing proceeds to block 212 (as explained below) where the client computer proceeds to operate in a normal manner. In some embodiments, client computer may monitor for changes in content. In some embodiments, client computer may be configured to receive changes or updates in content in an asynchronous manner.

At block 212, server computer 128 may check for changes or updates in second content 114 at content database 130 located at the server. As explained above, client computer 102 may have already received first content 112 from the server. It is assumed, to illustrate, that first content 112 is in the English language and that second content 114 is a French language translation of the first content. If there is a change in second content 114, then server computer 128 may send client computer 102 updated first content because there was a change in second content and because second content is a translation of first content. Once server computer 128 sends the updated content to client computer 102, processing proceeds to block 214 where client computer proceeds to process the updated content. On the other hand, if there is no change or update in second content, then processing proceeds back to block 212 where the server continues to check for changes in second content. It should also be understood, that in addition to checking for changes in second content server is also checking for changes in first content. If there are changes to first content, server computer may also notify client computer of such changes.

At block 214, if there is a change in second content, then server computer sends to client computer updated first content. In other words, a change in the French translation of the content has an effect on the English language content. The client computer is notified of the change in first content by receiving first content. In this manner, client computer is synchronized with changes in content in different languages.

At block 216, client computer proceeds to display the updated first content at the client computer. In one embodiment, management module 108 may receive the updated first content and store it in embedded content database at client computer. In this manner, client computer may only need to store the latest version of content and not every version of the content. This technique may help reduce storage requirements of the client computer.

Figure 3:
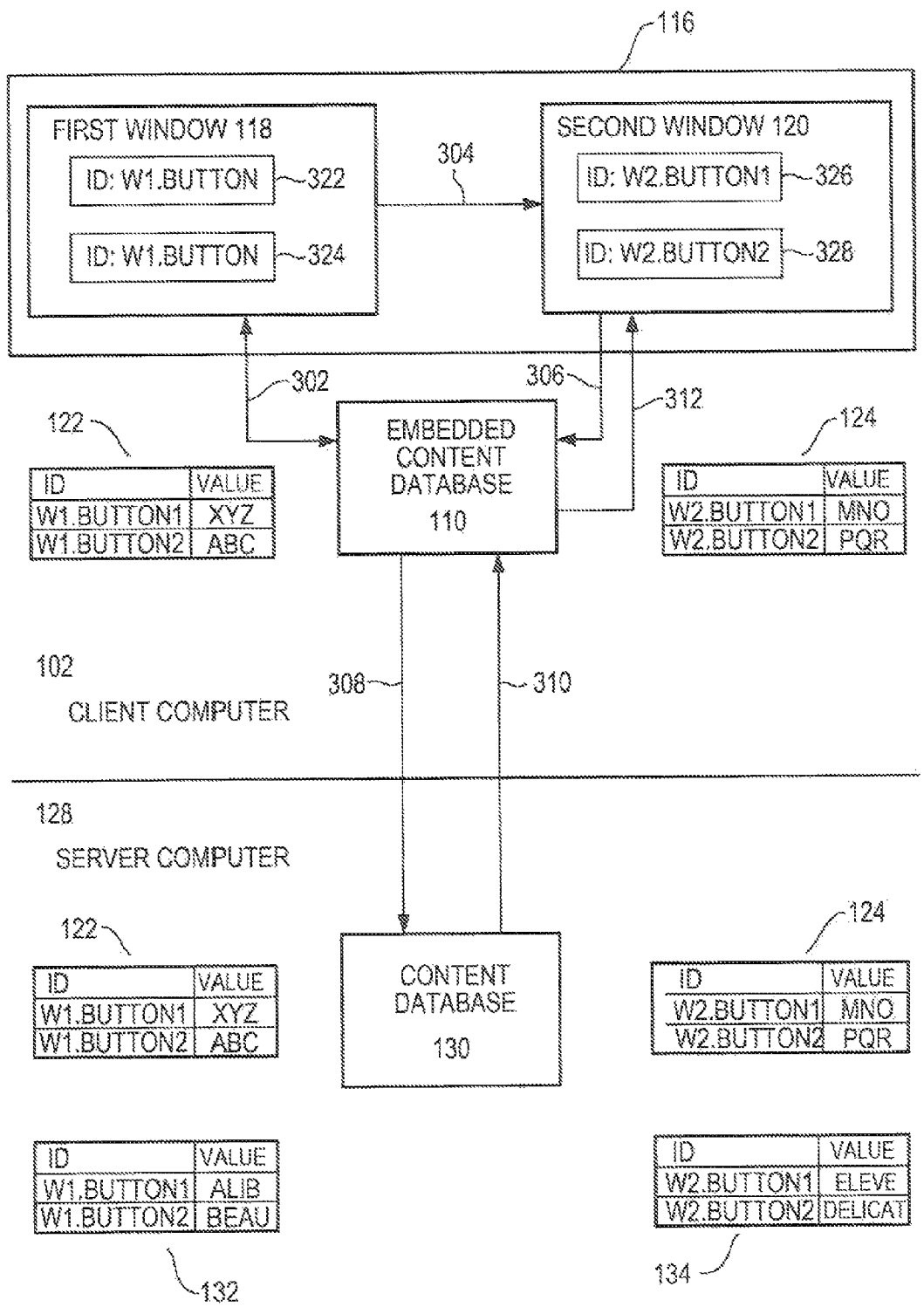
FIG. 3 is a diagram showing operation of the system of FIG. 1 in accordance with at least some illustrative embodiments

FIG. 3 shows the operation of the system of FIG. 1 in accordance with at least one embodiment of the invention. To illustrate the operation of the system, in one embodiment, it will be assumed that a user is interested in executing application program 116 which is configured with first content 112 in the English language, as the default language. The application program 116 may comprise first window 118 and second window 120. The first window 118 may be configured to display first portion 122 of first content and second window 120 may be configured to display second portion 124 of first content. In one embodiment, first window 118 may be configured to display first button 322 and second button 324. The first and second buttons are UI elements. The buttons are for illustrative purposes. It should be understood that other UI elements may be, used. The first button 322 is associated with an identifier labeled "W1.Button1" and the second button 324 is associated with an identifier labeled "W2.button2". In one embodiment, the first content 122 is organized as table entries with text values and identifiers associated or linked with the corresponding button identifiers. In a similar manner, second window 120 may be configured to display first button 326 and second button 328. The first button 326 is associated with an identifier labeled "W1.Button1" and second button 328 is associated with an identifier labeled "W2.button2". The second portion of first content 124 may be organized as table entries with text values and identifiers associated or linked with the corresponding button identifiers.

In one embodiment, application program 116 may reside on client computer 102 and coupled to server computer 128 over network 126. It will be further assumed that the user is interested in having the application program display first content in the English language and then having the application program display second content 114 in the French language. It will be further assumed that only first portion 122 of first content is stored in embedded database 110. In addition, second portion 124 is not stored in embedded database, but rather, resides on the server computer. As a result, as explained below, client computer 102 may need to request second portion 124 from server computer 128 when the user causes application program to navigate from first window 118 to second window 120. It is also assumed that the user has selected a word processing program as the application program. Of course, the system may be configured to operate in a similar manner when using any other program such as a database program, calendar program, contact spreadsheet or any other program.

In operation, in one embodiment, the user specifies that the local or default language requirement for the content is to be in the English language. The client computer 102 may record this information for later use such as, for example, when it has to determine which language the first content is to be displayed by the application program. The user may proceed to request that client computer 102 execute application program 116. The client computer 102 recognizes that the language preferred by the user is English. The client computer checks whether first portion of first content 122 is stored in embedded database 110. As explained above, it is assumed that first portion is stored in embedded database, therefore, there may be no need to send a request to server computer for the first portion. The client computer 102 proceeds to retrieve first portion of the content 122 from the embedded database and forward it to application program (shown by arrow 302). The application program receives the content and then displays it on first window 118. The client computer 102 may establish a bind relationship between first portion of the content 122 and the embedded database 110 on client computer 102 and content database 130 on server computer 128. The bind relationship may allow the server computer 128 to notify client computer 102 of any occurrences of changes to the first content. In one embodiment, server computer 128 can notify client computer 102 in an asynchronous manner by automatically sending update content to the client computer as soon as there is a change in content. This is performed without the client computer having to send a request to the server computer for changes. For example, if the content "XYZ" is stored at content database and the content changes to "XYYZZ", then the server computer sends the updated content to client computer. The client computer receives the update content and may overlay the previous content with the updated content. In addition, client computer 102 may store the updated content in embedded database 110 for subsequent use by application program or for any other purpose.

The user now proceeds to select second window 120 from program (shown by arrow 304). As explained above, application program 116 includes first window 118 and second window 120. The application program 116 determines that second window 120 requires second portion 124 of first content to be able to operate correctly (shown by arrow 306). That is, it needs the content because it displays it are part of operation. It is assumed that second portion 124 of first content is not, stored in embedded database. As a result, client computer 102 generates a request to server computer 128 to obtain second portion 124 of the first content (shown by arrow 308). The server computer 128 receives the request and proceeds to retrieve second portion. Once the server computer finds second portion, it sends the content to the client computer. The client computer 102 receives the second portion (shown by arrow 310) and stores it in embedded database 310. The client computer forwards the content to application program 116 which may proceed to display it on second windows 120 (shown by arrow 312). In addition, as explained above with respect to the bind relationship with first window 118, client computer 102 also establishes a bind relationship between the second portion 124 of the first content and the embedded database on client computer and content database on computer 128. As explained above, this bind relationship allows the server computer to notify the client computer of any changes to the first content.

In other embodiment, continuing with FIG. 3, to further illustrate, it will be assumed that the user is now interested in having the application program display content in a second language such as French. This is represented as first portion of second content 132 and second portion of second content 134. This content is stored in content database 130 of server computer 128 and not in embedded database 110 at client computer 102. As explained above, client computer 102 established a bind operation between first content in the embedded database and content database in server computer. As a result, the user request to have application program display French content causes the client computer to automatically request the French content. Once client computer 102 receives this content, it may establish a bind operation between second content 114 (first and second portions) in embedded database 110 in client computer and content database 130 in server computer 128. In this manner, the bind relationship may allow the server computer to notify the client computer of any changes to the second content. This may be beneficial when an application program has a plurality of UI elements comprised of language content text or images and the developer of the application desires to minimize the installation size of the application program. That is, only the content needed by the application during execution is stored on client computer thereby minimizing the storage requirements of the client computer.

In other embodiment, continuing with FIG. 3, to further illustrate, it will be assumed that first content 112 (including portions 122 and 124) is in the English language and stored in embedded database 110 upon installation of the application program. In other words, the English language content is installed in the client computer as default content for the application program. In operation, the user then desires to have the application program display content in the French language. Since the French content is not stored in the embedded database, the client computer sends the server computer a request for the French content. The client computer receives the French content from the server content and stores it in embedded database. The client computer may establish a bind operation between French content n the embedded database 110 in client computer and content database 130 in server computer. In this manner, the bind relationship allows the server computer to notify the client computer of any changes to the second content. This is a beneficial when the developer of the application program sets the default content to be in English language on the client computer and when a network connection is not available. When a network connection between the client computer and the server computer becomes available, the client computer can request that the French content be sent or downloaded and synchronized between the embedded database on the client computer and the content database on the server computer.

In some embodiments, the system 100 of FIG. 1 can provide advantages. For example, the relevant localized content may be stored in the embedded database at the client computer. The content may be accessed at the client computer on an on-demand basis and synchronized automatically with production localized content at the server computer. This system may reduce the work needed in maintaining the client computer synchronized with latest localization updates and also reduce the content deployment size of the application program.

In some embodiment, the system 100 of FIG. 1 may used to improve the language translation process. For example, the system may be able reduce the latency between the time English content is produced for the application program and the time for the generation/update of corresponding translated content. As developers add new content for the application program, translators may be notified of the changes, and start working on the translation of text and content. As they translate and submit their deliverable, content reviewers may be notified in order to review the content and approve the final content. The tasks between adding content for translation and reviewing the content may occur in a semi-parallel fashion. This may improve and minimize the latency between content addition and translation. The translators may be in lock-step with the development team in translation. There may also be a virtual barrier between the deliverables of each team. The developers may not be affected as the content is translated in parallel and approved.

In some embodiments, the system 100 of FIG. 1 may be configured to operate, in part, according to the Synchronization Framework from Microsoft®. The system may comprise two types of databases. First, a production localized main content database may be used to store main localized content after going through a review/approval cycle. The cycle may comprise review and approval of content. Second, a working localized content database may be used to store relevant content tables (e.g., English/Spanish/etc. . . . ) from the main database. The content of the working database may also form the content of the embedded database at the client computer. The server computer may include a translator editor application which may include an inbox filled with translation tasks. The translation tasks may arrive at the inbox every time there is an update in the database or a modified/new content for the application program. The system may include a runtime component which may provide conflict resolution and auto-update features when performing translation tasks on the working database. The system may include a sync service provider component which can be used to synchronize local replica of desired table with other replicas.

In some embodiments, the system may provide for synchronization sessions wherein a destination provider is connected with the source provider to synchronize items changed in source replica. During synchronization, the working database may provide its current knowledge, accept a list of changes from the production database, detect any conflicts between that list and its own items, and apply changes to its data store. The production database source may use the working database replica's (destination) current knowledge to determine which changes are in its replica that the working database replica does not know about, and send the list of changes to the provider at the destination. The system may include metadata which represents information about replicas and items. This information may be used to track the knowledge that each replica contains so that synchronization can be performed. The system may include a review workflow component which may provide an automated review and approval process configured to send the relevant sync updates before committing the final information to the production database. The system may include synchronization proxy provider component to send commands and metadata over the network to the remote provider. A proxy component may provide an interface between a remote deployed client provider and the production database.

At the client computer, a user may be able to launch an application and specify the current locale such as, for example, Spanish. This may cause the system to connect to the production database at the server and request for the Spanish content table. At the client computer, a relatively small embedded database may be created which includes the latest updates. A synchronization table may be created only for the Spanish locale with the content (e.g., images, XML, and so on) as needed. The user may be provided with an option to change locale settings. For example, the user may be able to specify the current local to be the United States (for example, English language). Once this is done, the sync service provider component at the client computer may contact the remote synchronization proxy provider component at the production server computer for the English content table. As a result, an English sync table may be created in the embedded database at the client computer. The metadata-store may recognize that it may need to keep track of changes in production server and that it may be responsible for updating the embedded database.

There may be several means of synchronizing updates between the embedded database at the client computers and the production database at the server computer. In one embodiment, the system can employ a one-way synchronization technique, wherein the relevant updates from the production database at the server computer are synchronized with the embedded database at the client computer. The embedded database may be provided by SQL Server compact and the synchronization process can be handled by the Framework. There may be several ways to configure how frequent the information in the production database is to be tracked. For example, the system may use inline tracking techniques where updates to the database are synchronized immediately and/or in real-time. In another example, the system may employ asynchronous tracking where an external process can be used for performing change tracking in a periodic manner. In one embodiment, asynchronous tracking may be beneficial because it may reduce the impact on the performance of an application program. The application program may be configured to read content from the embedded database based on the locale. In one, embodiment, the application program can be configured to use LINQ to SQL or ADO.net services. A library may be provided for the interaction layer between the application and the Framework. The library can be used in Extensible Application Markup Language (XAML) as a markup extension for easier maintainability.

The following is a description of the system from the perspective of different users of the system. In one embodiment, for example, from the perspective of a developer of content, it will be assumed that the developer is starting to develop code or content for a new component or UI element. The developer may use an editor program to develop the new component. Based on selected locale (for example, master locale—English) in debug configuration, the corresponding synchronization table from the server may be downloaded. The database schema in the production database may be pre-determined and designed beforehand. The developer may add text/content for the application using identifiers and add text values into the embedded database using for example, SQL management studio. Once this work is complete, a service component asynchronously synchronizes the data from the embedded database to the production database after the relevant code review automated workflow.

A description is now provided from the perspective of a translator. In one embodiment, once the new master locale (English) content/text is added in the production database at the server, a service component sends notification to relevant (or subscribed) locale translator's inbox. The translator may have an embedded database with a relevant locale synchronization table. The translator may perform the translation work and the service may synchronize with the production database after review/approval cycle automated workflow. In one embodiment, the text may be machine translated before the text is sent to the translator's inbox in order to minimize the translation time required.

A description is now provided from the perspective of a content reviewer. In one embodiment, after the work goes through an automated review and approval cycle, the end-of-day's translation work is rerouted to all reviewers. Each reviewer may have the relevant synchronization table for viewing and approving the content. Once approved, the final text/content may be committed and recorded to the production database at the server.

A description is now provided from the perspective of the user or consumer. In one embodiment, the relevant locale embedded database may be installed onto the client computer before the computer is shipped. In this scenario, the client computer may not require a network connection, at least, not initially. The relevant database may go through an on-demand synchronization process with the production database when the user goes through an initial setup stage at the client computer. In this scenario, the client computer may require a network connection initially. A service component running in the client computer may synchronously synchronize with the production database at the server computer when changes in text occur at the server.

Embodiments of the present invention may provide one or more advantages. In one embodiment, the system may include one file which has the translated content for all country and languages. The system may not require separate folders for resource files having translated content information for each country and language. This may reduce the storage requirements of the system. In one embodiment, the system may provide content and resources at the server and only require that the relevant content and resources be downloaded to the client computer. This may help minimize the hard disk footprint of localized content in the client computer. The system may not require that all the content translation and resources be in the client computer. This may help decrease the installation size of the software at the client computer. In one embodiment, the system may reduce the time between software development and translation activities. This may enable easier maintenance and process flow from developers to content translators. In one embodiment, the system may provide automatic synchronization of content of the embedded database which enables the client computer to be up-to-date with content changes in the production database at the server. The system can reduce the need for storage by only storing content that has been requested by the application or necessary for the operation of the application program.

As noted above, embodiments within the scope of the present invention may include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

Some embodiments of the invention are described in the general context of method steps, which may be implemented in one embodiment by a program product including computer-executable instructions, such as program code, executed by computers in networked environment. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention, in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The present subject matter may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the present disclosure might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the present invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

The above discussion is meant to be illustrative of the principles and various embodiments of the present disclosure. Numerous variations and modifications will become apparent to those skilled in the art once the above disclosure is fully appreciated. For example although the illustrative embodiments of the present disclosure are shown and described within the context of a single computer, the functionality of the single computer could be distributed over a plurality of computers. It is intended that the following claims be interpreted to embrace all such variations and modifications.

What is claimed is:

1. A client computer to process content in a plurality of languages comprising:
    an embedded database for storage and retrieval of content in a plurality languages, the content configuring user interface elements of an application program executing on the client computer, the user interface elements each associated with an identifier for associating the content, wherein first content is the content in a first language and second content is the content in a second language translated from the first language; and
    a content management module stored as instructions on a non-transitory computer-readable medium and executable by a processor to:
    establish a bind relationship between the content in the embedded database and a content database on a server computer, the bind relationship allowing the server computer to notify the client computer of any occurrences of changes to the content;
    generate by the application program at the client computer a request to the server computer for the first content, if the first content is not stored in the embedded database, and
    automatically receive from the server computer updated first content, if there is a change in the second content,
    store the first content in the embedded database at the client computer;
    retrieve the first content from the embedded database at the client computer;
    display the first content on a window of the application program at the client computer; and
    overlay the displayed first content with the updated first content.

2. The client computer of claim 1 further comprising instructions to:
    display a first portion of the first content on a first window of the application program at the client computer;
    receive a request to display a second portion of the first content on a second window of the application program; and
    generate, by the application program at the client computer, a request to the server computer for the second portion of the first content, if the second portion is not stored in the embedded database of the client computer.

3. The client computer of claim 1 further comprising instructions to:
    automatically receive from the server computer the updated first content in the first language, if there is a change in the first content at the server.

4. The client computer of claim 1 further comprising instructions to provide a synchronization mechanism to notify the client computer of any changes to content that occurs at the server computer.

5. The client computer of claim 1 further comprising instructions to asynchronously notify the client computer of any changes to content by automatically sending updated content to the client computer when there are changes in content.

6. The client computer of claim 5 wherein sending updated content to the client computer is without having the client computer request content from the server computer.

7. A method of processing content in a plurality of languages, the method comprising:
    establish a bind relationship between content in an embedded database, wherein the embedded database stores and retrieves content in a plurality languages, the content configuring user interface elements of an application program executing on the client computer, the user interface elements each associated with an identifier for associating the content, wherein first content is the content in a first language and second content is the content in a second language translated from the first language, at a client computer and a content database on a server computer, the bind relationship allowing the server computer to notify the client computer of any occurrences of changes to the content;
    generating, by the application program at the client computer, a request to the server computer for first content which is in a first language, if the first content is not stored in an embedded database of the client computer; and
    automatically receiving from the server computer updated first content in the first language, if there is a change in second content which is content in a second language translated from the first language;
    storing the first content in the embedded database at the client computer;
    retrieving the first content from the embedded database at the client computer;
    displaying the first content on a window of the application program at the client computer; and
    overlaying the displayed first content with the updated first content.

8. The method of claim 7 further comprising:
    displaying a first portion of the first content on a first window of the application program at the client computer;
    receiving a request to display a second portion of the first content on a second window of the application program; and
    generating, by the application program at the client computer, a request to the server computer for the second portion of the first content, if the second portion is not stored in the embedded database of the client computer.

9. The method of claim 7 further comprising:
    automatically receiving from the server computer updated first content in the first language, if there is a change in the first content at the server.

10. The method of claim 7 further comprising:
    automatically generate a request to the server computer for second content, if the second content is not stored in the embedded database.

11. The method of claim 7 further comprising notifying translators of changes as developers add new content to the application program.

12. The method of claim 11 further comprising notifying content reviewers of translated content of the translators.

13. The method of claim 12, wherein adding content for translation and reviewing the content occurs in a semi-parallel fashion, reducing latency between content addition and translation.

14. The method of claim 7 wherein the embedded database is a working localized content database that stores content tables from a main database.

15. The method of claim 7 further comprising receiving translation tasks at a translator editor application at the server computer.

16. A non-transitory computer-readable medium having stored thereon instructions to be executed, the instructions, when executed by a processor, cause the processor to:
- establish a bind relationship between content in an embedded database, wherein the embedded database stores and retrieves content in a plurality languages, the content configuring user interface elements of an application program executing on the client computer, the user interface elements each associated with an identifier for associating the content, wherein first content is the content in a first language and second content is the content in a second language translated from the first language, at a client computer and a content database on a server computer, the bind relationship allowing the server computer to notify the client computer of any occurrences of changes to the content;
- generate, by the application program at the client computer, a request to the server computer for the first content, if the first content is not stored in the embedded database; and
- automatically receive from the server computer updated first content in the first language, if there is a change in second content which is content in a second language translated from the first language;
- store the first content in the embedded database at the client computer;
- retrieve the first content from the embedded database at the client computer;
- display the first content on a window of the application program oat the client computer; and
- overlay the displayed first content with the updated first content.

17. The computer-readable medium of claim 16, further comprising instructions, which when executed by the process, cause the processor to:
- display a first portion of the first content on a first window of the application program at the client computer;
- receive a request to display a second portion of the first content on an second window of the application program; and
- generate, by the application program at the client computer, a request to the server computer for the second portion of the first content, if the second portion is not stored in the embedded database of the client computer.

18. The computer-readable medium of claim 16, further comprising instructions, which when executed by the process, cause the processor to:
- automatically receive from the server computer updated first content in the first language, if there is a change in the first content at the server.

19. The computer-readable medium of claim 16, further comprising instructions, which when executed by the process, cause the processor to:
- store the first content in the database of the client computer; and retrieve the first content from the database of the client computer.

20. The computer-readable medium of claim 16, further comprising instructions, which when executed by the process, cause the processor to:
- update the displayed first content with the updated content by overlaying the displayed first content with the update first content.

* * * * *

UNITED STATES PATENT AND TRADEMARK OFFICE
CERTIFICATE OF CORRECTION

PATENT NO.         : 8,862,661 B2
APPLICATION NO.    : 13/639506
DATED              : October 14, 2014
INVENTOR(S)        : Karthik Jayaraman Page 1 of 1

It is certified that error appears in the above-identified patent and that said Letters Patent is hereby corrected as shown below:

In the Claims

Column 16, line 2, in Claim 16, delete "oat" and insert -- at --, therefor.

Signed and Sealed this
Third Day of March, 2015

Michelle K. Lee
*Deputy Director of the United States Patent and Trademark Office*